(12) United States Patent
Nelson

(10) Patent No.: US 9,439,351 B2
(45) Date of Patent: Sep. 13, 2016

(54) BOOM ARM CUTTING DISK DEVICE

(71) Applicant: Matt Nelson, Sioux Falls, SD (US)

(72) Inventor: Matt Nelson, Sioux Falls, SD (US)

( * ) Notice: Subject to any disclaimer, the term of this patent is extended or adjusted under 35 U.S.C. 154(b) by 0 days.

(21) Appl. No.: 14/461,119

(22) Filed: Aug. 15, 2014

(65) Prior Publication Data

US 2016/0044866 A1  Feb. 18, 2016

(51) Int. Cl.
*A01G 23/06* (2006.01)
*A01D 34/73* (2006.01)

(52) U.S. Cl.
CPC ............. *A01D 34/733* (2013.01); *A01D 34/73* (2013.01); *A01G 23/06* (2013.01); *A01G 23/067* (2013.01)

(58) Field of Classification Search
USPC ...... 56/17.5, 255, 295; 144/24.12, 176, 235, 144/334; 241/92
See application file for complete search history.

(56) References Cited

U.S. PATENT DOCUMENTS

| | | | |
|---|---|---|---|
| 3,797,544 A | 3/1974 | Ver Ploeg | |
| 3,818,957 A * | 6/1974 | Schoonover | A01G 23/093 144/24.12 |
| 4,052,801 A * | 10/1977 | Smith | E02F 3/9275 241/278.1 |
| 4,298,044 A * | 11/1981 | Hansel | B27L 11/005 144/176 |
| 4,967,546 A * | 11/1990 | Forbush | A01D 42/005 56/255 |
| 5,133,176 A | 7/1992 | Baumann et al. | |
| 5,137,219 A * | 8/1992 | Morey | B02C 18/22 144/176 |
| 5,205,112 A | 4/1993 | Tillotson et al. | |
| 5,365,725 A | 11/1994 | McCance | |
| 5,890,354 A | 4/1999 | Bednar | |
| 6,435,234 B1 | 8/2002 | Paumier | |
| 7,299,613 B2 | 11/2007 | Samejima et al. | |
| 8,127,522 B2 | 3/2012 | Campbell | |
| 2011/0100508 A1* | 5/2011 | Fraley | A01G 23/067 144/24.12 |

\* cited by examiner

*Primary Examiner* — Alicia Torres

(57) ABSTRACT

A boom arm cutting disk device for using a full area of a boom arm mounted cutting disk to cut materials facilitating vertical cutting and mulching of trees, brush, or the like. The device includes a disk configured for mounting on a boom arm such that the disk is rotatable relative to the boom arm. Each of a pair of cutters is coupled to and extends from the disk. Each of the cutters has a respective interior side edge aligned with a center of the disk and a respective blade edge extending outwardly from the interior side edge. Each blade edge defines a leading edge of the cutter as the disk is rotated wherein the cutters are configured to cut material by contact with the leading edges as a central area of the disk is urged towards the material while the disk is rotated.

13 Claims, 7 Drawing Sheets

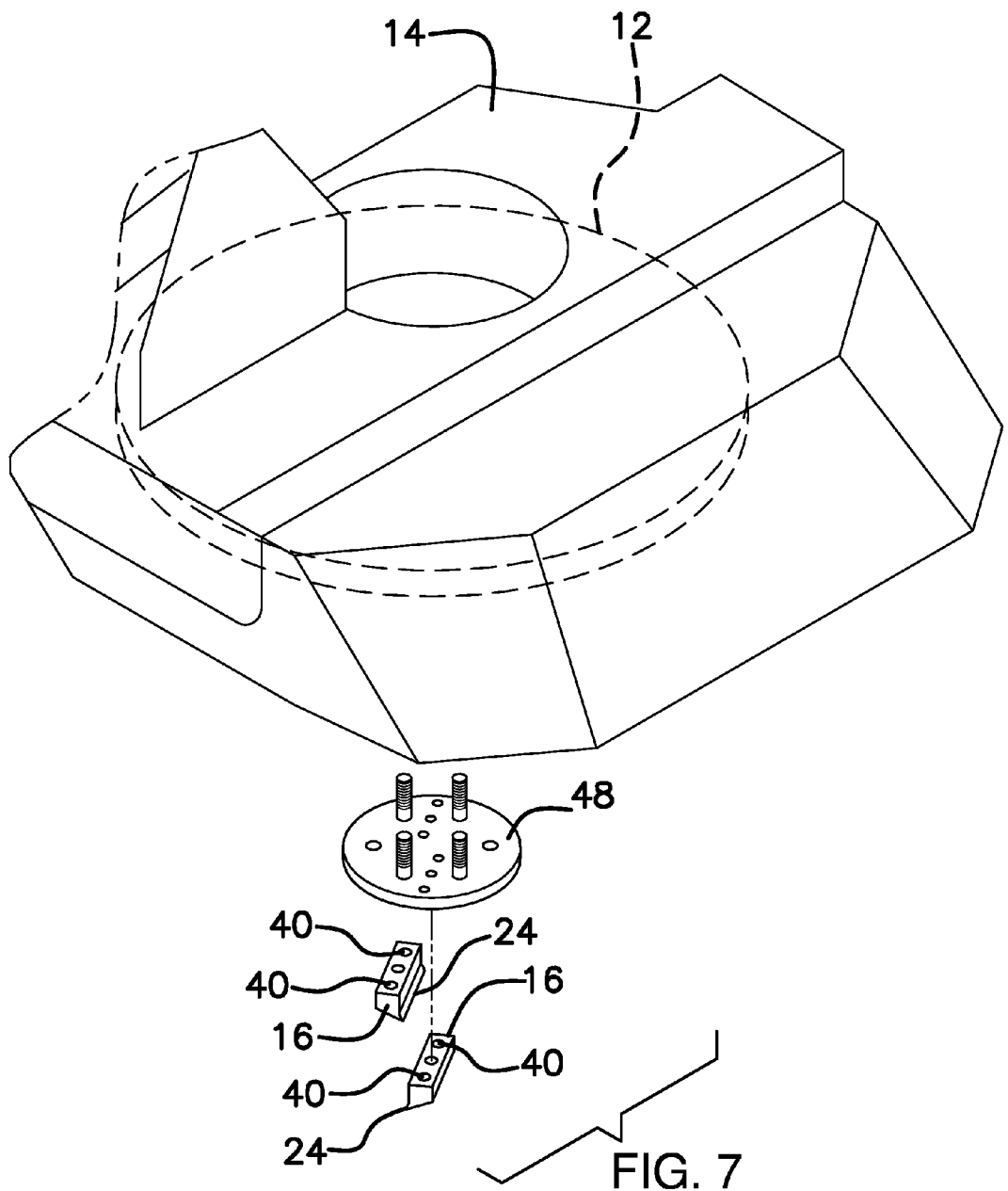

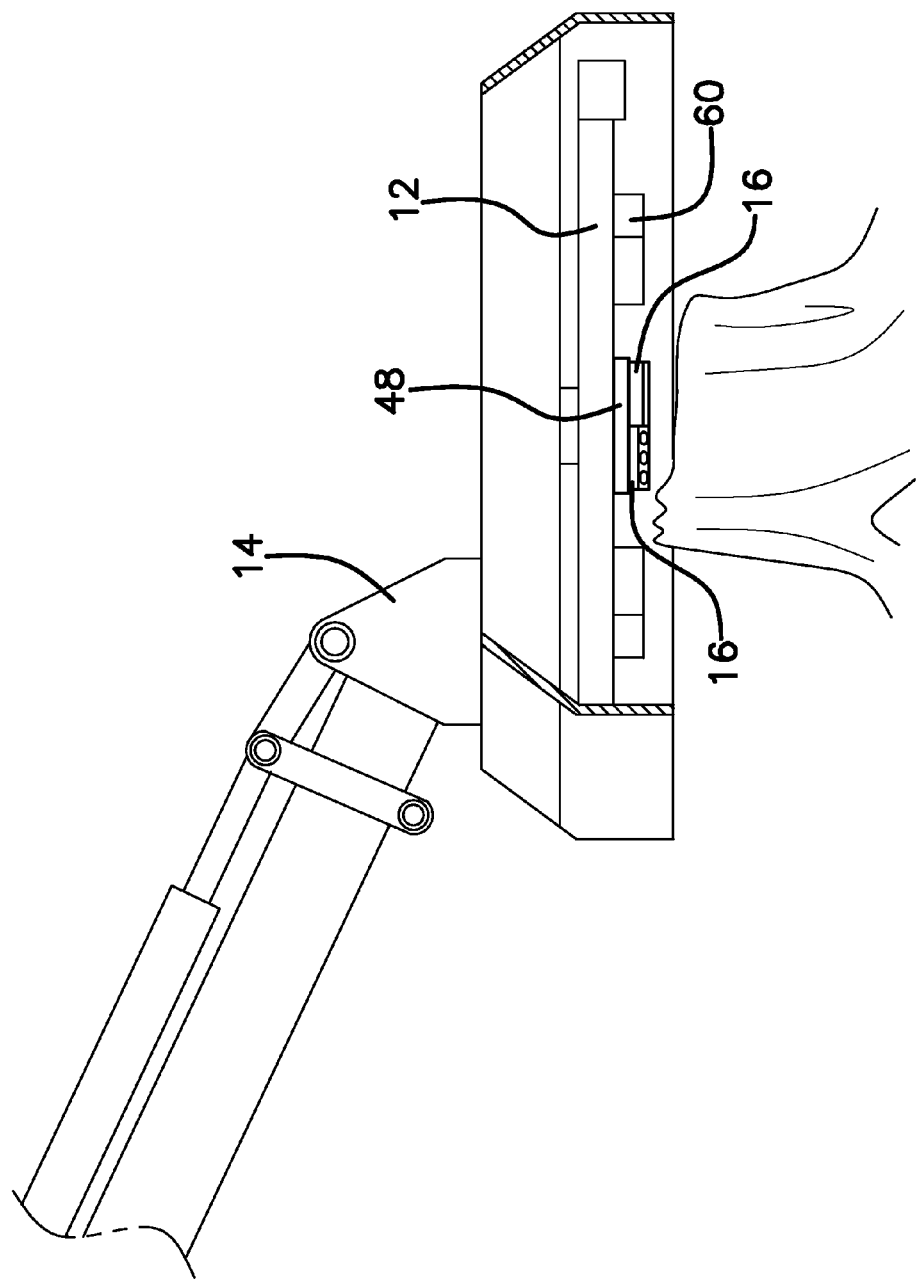

BOOM ARM CUTTING DISK DEVICE

BACKGROUND OF THE DISCLOSURE

Field of the Disclosure

The disclosure relates to cutting disk devices and more particularly pertains to a new cutting disk device for using a full area of a boom arm mounted cutting disk by removing a dead area from a center of the disk to facilitate vertical cutting and mulching of trees, brush, or the like.

SUMMARY OF THE DISCLOSURE

An embodiment of the disclosure meets the needs presented above by generally comprising a disk configured for mounting on a boom arm such that the disk is rotatable relative to the boom arm. Each of a pair of cutters is coupled to and extends from the disk. Each of the cutters has a respective interior side edge aligned with a center of the disk and a respective blade edge extending outwardly from the interior side edge. Each blade edge defines a leading edge of the cutter as the disk is rotated wherein the cutters are configured to cut material by contact with the leading edges as a central area of the disk is urged towards the material while the disk is rotated.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein:

FIG. 7 is an exploded top front side view of an embodiment of the disclosure in an inverted position for attachment to a boom arm.

FIG. 8 is a partial cut-away side view of an embodiment of the disclosure in use.

DESCRIPTION OF THE PREFERRED EMBODIMENT

Figure 1:
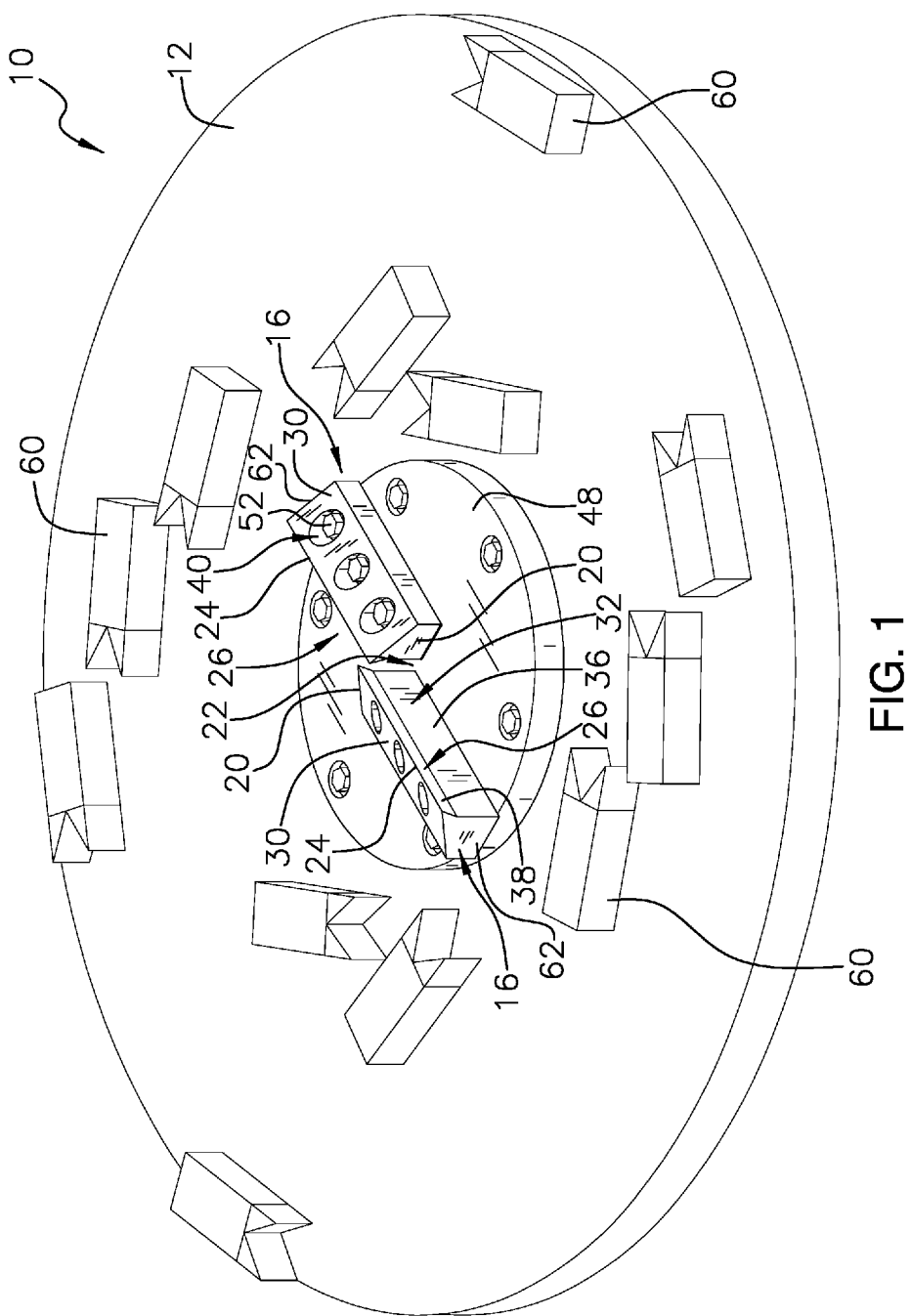
FIG. 1 is a top front side perspective view of a boom arm cutting disk device according to an embodiment of the disclosure.
Figure 2:
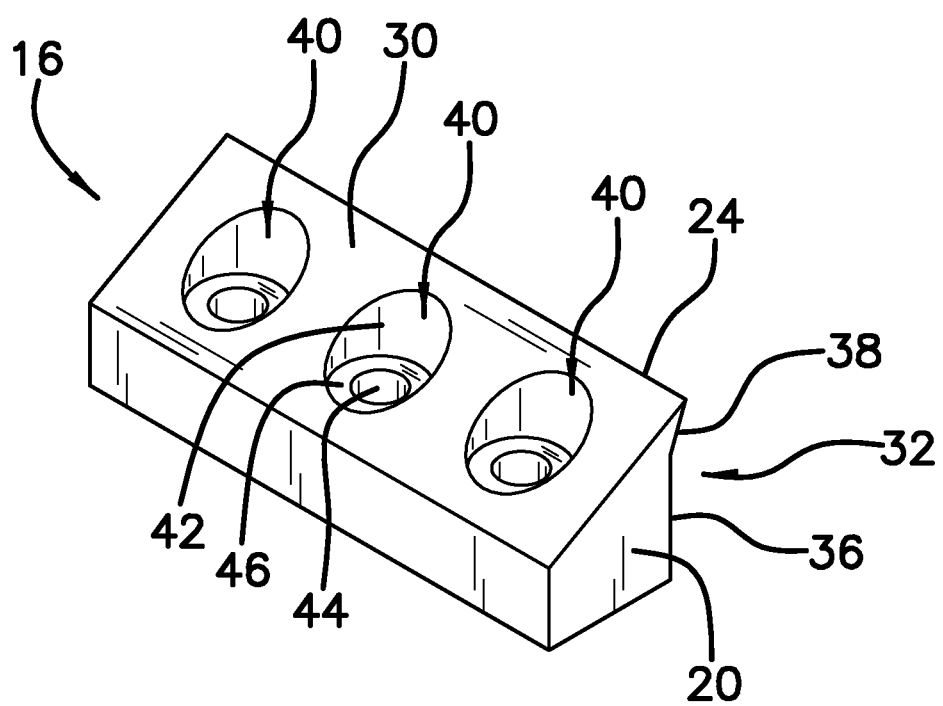
FIG. 2 is a top front side perspective view of a cutter of an embodiment of the disclosure.
Figure 3:
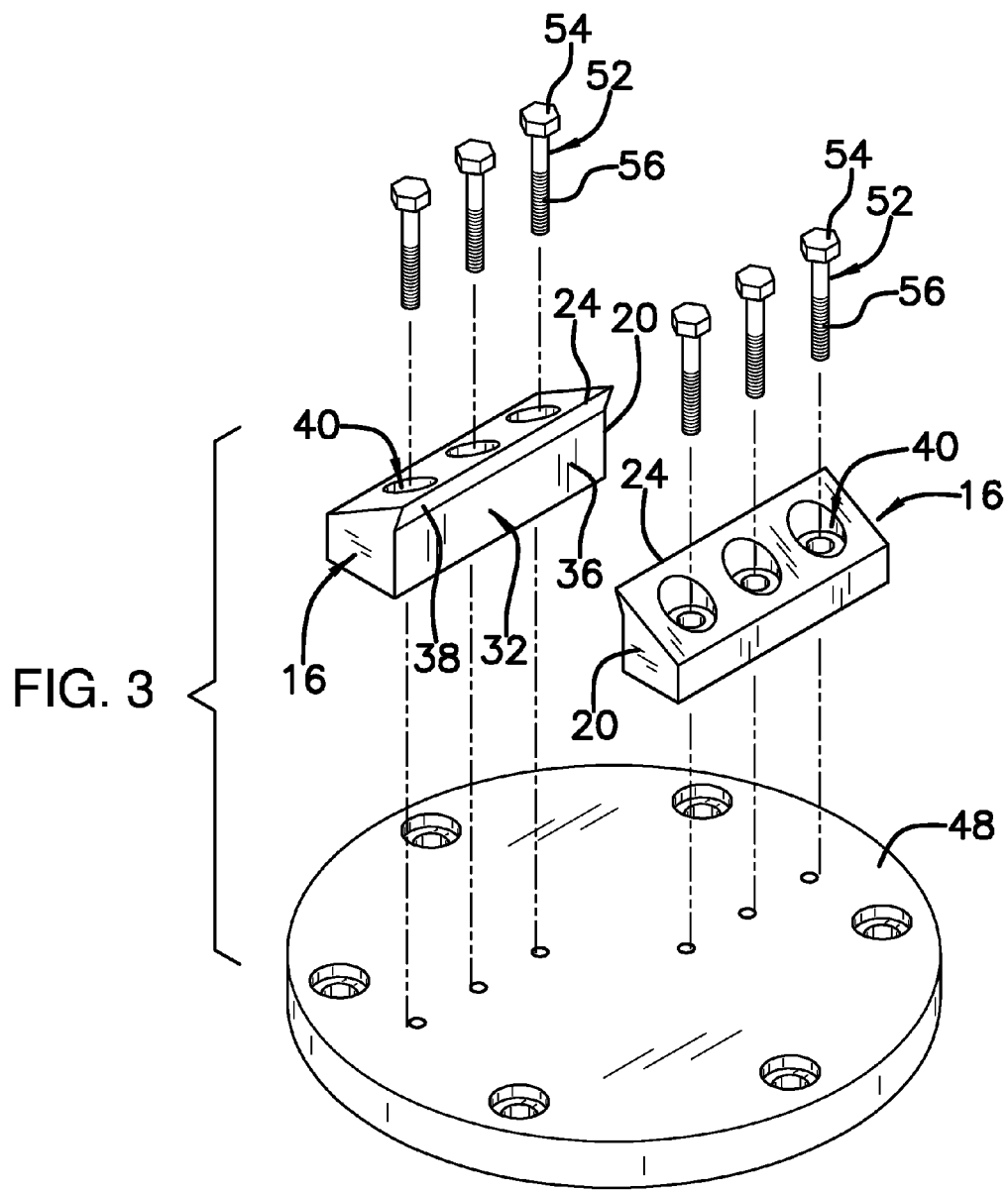
FIG. 3 is an exploded top front side perspective view of an embodiment of the disclosure.
Figure 4:
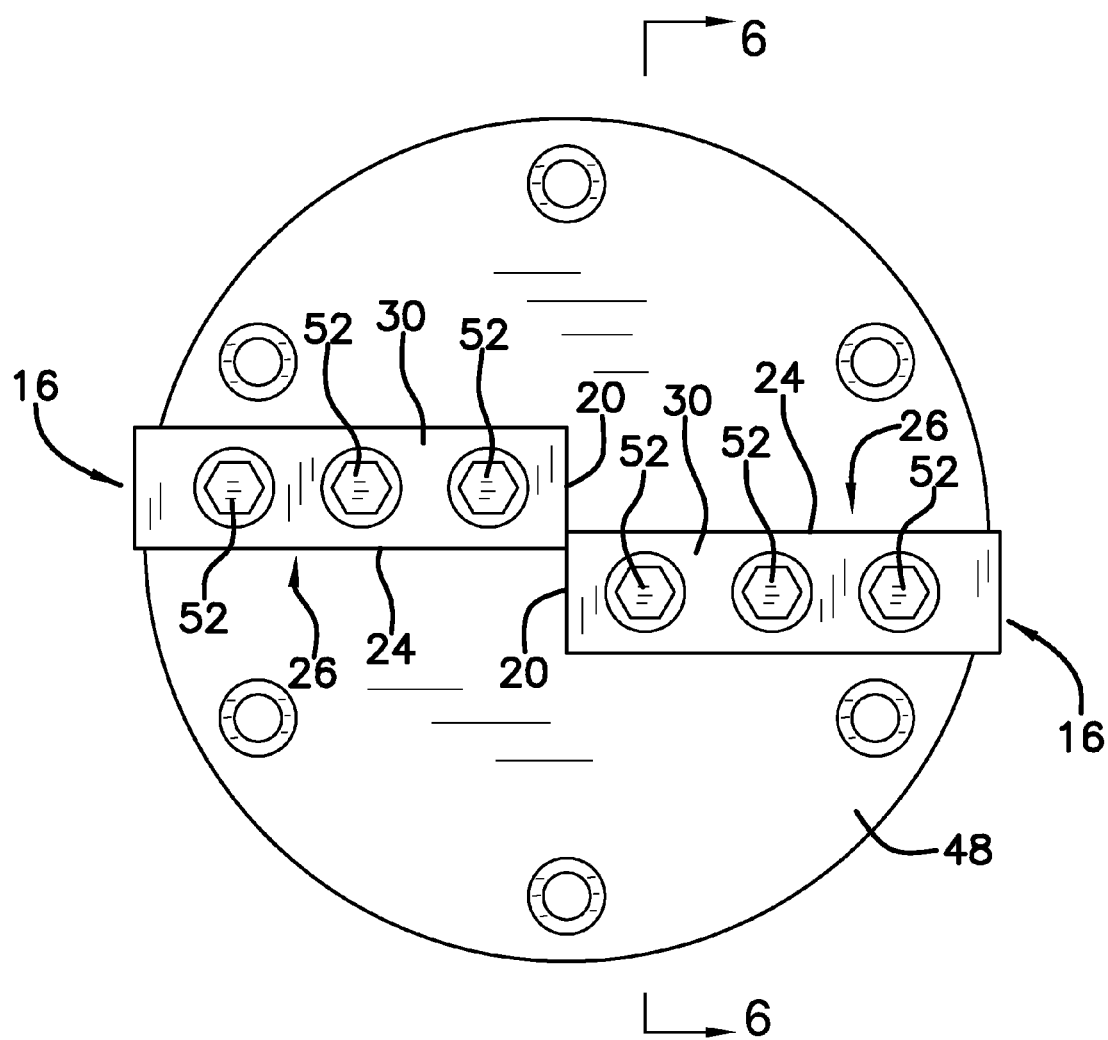
FIG. 4 is a top view of an embodiment of the disclosure.
Figure 5:
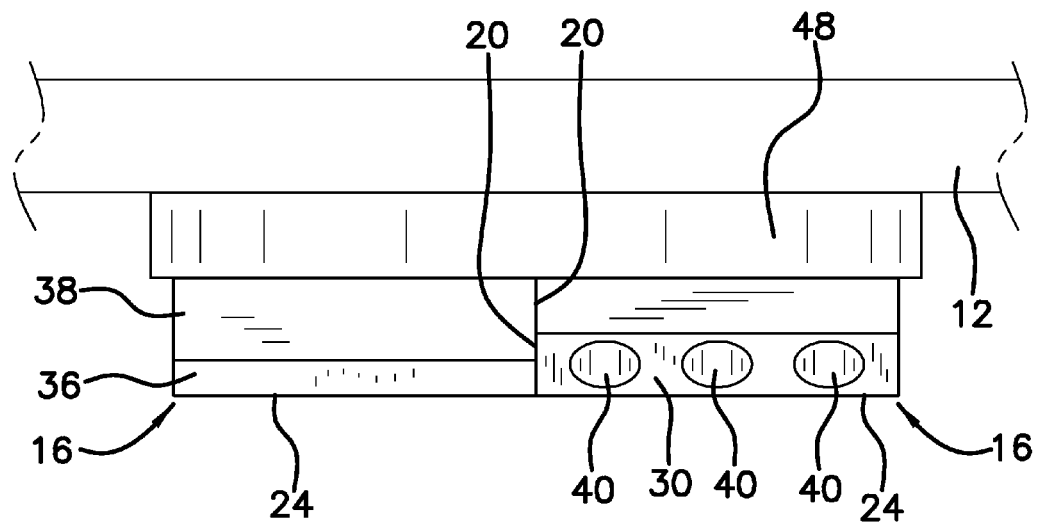
FIG. 5 is a front view of an embodiment of the disclosure.
Figure 6:
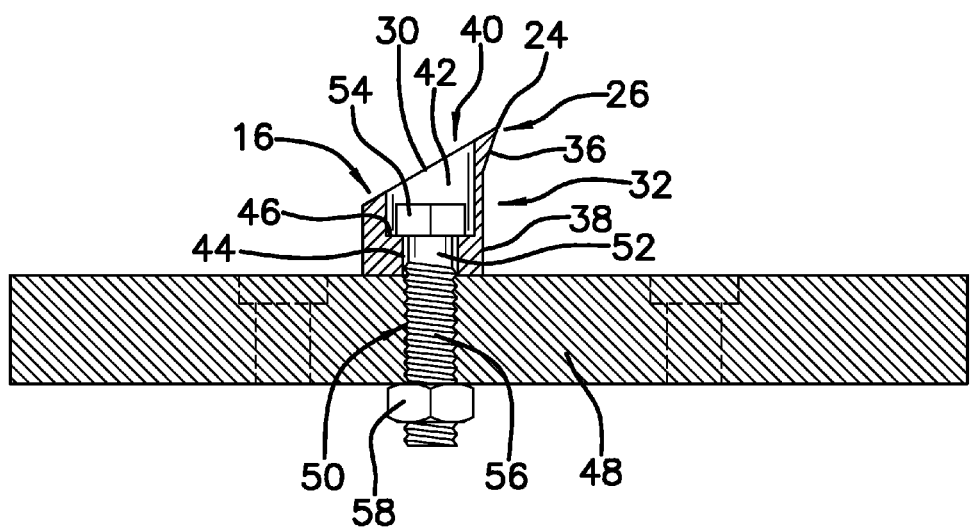
FIG. 6 is a partial cross-sectional view of an embodiment of the disclosure taken along line 6-6 of FIG. 4.

With reference now to the drawings, and in particular to FIGS. 1 through 8 thereof, a new cutting disk device embodying the principles and concepts of an embodiment of the disclosure and generally designated by the reference numeral 10 will be described.

As best illustrated in FIGS. 1 through 8, the boom arm cutting disk device 10 generally comprises a disk 12 configured for mounting on a boom arm 14 such that the disk 12 is rotatable relative to the boom arm 14. Each of a pair of cutters 16 is coupled to the disk 12. Each cutter 16 extends from the disk 12 standing out from face 18 of the disk 12. Each of the cutters 16 has a respective interior side edge 20 aligned with a center 22 of the disk 12. Each of the cutters 16 has a respective blade edge 24 extending outwardly from the interior side edge 20 relative to the center 22 of the disk 12. Each blade edge 24 defines a leading edge 26 of the cutter 16 as the disk 12 is rotated wherein the cutters 16 are configured to cut material by contact with the leading edges 26 as a central area 28 of the disk 12 is urged towards the material while the disk 12 is rotated. Each cutter 16 has a top surface 30. The top surface 30 is planar and angled between 55 and 65 degrees from the face 18 of the disk 12 such that each top surface 30 extends away from the disk 12 and towards the leading edge 26. Each cutter 16 also has a respective forward surface 32. The forward surface 32 has a top section 36 and a bottom section 38. The bottom section 38 is perpendicular to the face 18 of the disk 12 when the cutter 16 is attached to the disk 12. The top section 36 is angled relative to the bottom section 38 forming an obtuse angle between the top section 36 and the bottom section 38 between one hundred fifty seven (157) and one hundred sixty seven (167) degrees. Thus, the angle of the top section 38 relative to the face 18 of the disk 12 is between sixty seven (67) and seventy seven (77) degrees such that the top section 38 extends away from the bottom section 38 while extending away from the disk 12 and towards the leading edge 26. A total width of each cutter 16 is between 4 and 4.5 inches. A total height from a base 66 of the cutter 16 to the blade edge 24 is between 1.18 and 1.58 inches.

Each cutter 16 is structured to have a plurality of holes 40 extending through the cutter 16 from the top surface 30. Each hole 40 comprises a first section 42 and a second section 44. A diameter of the first section 42 is greater than a diameter of the second section 44 providing a lip 46 within each hole 40. There may be three holes 40 in each cutter 16 with a central hole 68 being centered along a length of the cutter 16 and each outer hole 70 being spaced evenly between 1.18 and 1.58 inches from the center of the central hole 68.

A base 48 is coupled to the disk 12 covering the central area 28. The base 48 has a plurality of connection apertures 50. Each of a plurality of connectors 52 is insertable into an associated one of the holes 40 of an associated one of the cutters 16 wherein the connectors 52 engage an associated one of the connection apertures 50. The connectors 52 couple the cutters 16 to the base 48. Each of the connectors 52 has a head 54 and a shaft 56. The head 54 of each connector 52 is inset into the associated hole 40 and abuts the lip 46 when the connector 52 is fully inserted into the associated hole 40. Each connector 52 may be secured by a respective bolt 58 or the like.

As is conventionally known in the use of disc cutters, a plurality of teeth 60 is coupled to and extends from the disk 12. Each of the teeth 60 is positioned radially outward from respective exterior side edges 62 of the cutters 16 wherein the teeth 60 are configured to cut material outside of the central area 28 as the disk 12 is rotated.

In use, the disk 12 is coupled to the boom arm 14 in a conventional manner and the disk 12 is rotated. The boom arm 14 is moved as desired to move the spinning disk 12 towards materials to be cut wherein the teeth 60 and the cutters 16 contact and cut or mulch the material contacted. The positioning of the cutters 16 provides for clearance of debris away from the spinning disk 12 while allowing for no dead space adjacent the center 20 of the disk 12 defined as area in which no teeth 60 or cutting blades are present as the disk 12 spins. Thus, the device 10 allows for positioning of the disc 12 such that cutting or mulching will occur if the material being cut is positioned anywhere within the confines of an outer perimeter of the outermost teeth.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A boom arm cutting disk device comprising:
  a disk, said disk being configured for mounting on a boom arm such that said disk is rotatable relative to the boom arm; and
  a pair of cutters coupled to said disk, each said cutter extending from said disk, each of said cutters having a respective interior side edge aligned with a center of said disk, each of said cutters having a respective blade edge extending outwardly from said interior side edge, each said blade edge being parallel to said disk, each said blade edge defining a leading edge of said cutter as said disk is rotated wherein said cutters are configured to cut material by contact with said leading edges as a central area of said disk is urged towards the material while said disk is rotated; and
  a plurality of teeth coupled to and extending from said disk, each of said teeth being positioned radially outward from respective exterior side edges of said cutters wherein said teeth are configured to cut material outside of said central area as said disk is rotated.

2. The device of claim 1, further comprising each said cutter having a top surface, said top surface being planar and angled such that each said top surface extends away from said disk and towards said leading edge.

3. The device of claim 1, further comprising said cutters each being coupled to a base, said base being coupled to said disk.

4. The device of claim 3, further comprising:
  each said cutter being structured to have a plurality of holes extending through said cutter from said top surface; and
  a plurality of connectors, each of said connectors being insertable into an associated one of said holes of an associated one of said cutters wherein said connectors couple said cutters to said base.

5. The device of claim 4, further comprising each of said connectors having a head, said head of each said connector being inset into said associated hole when said connector is fully inserted into said associated hole.

6. The device of claim 1, further comprising each said cutter having a respective forward surface, said forward surface having a top section and a bottom section, said top section being angled relative to said bottom section such that said top section extends away from said bottom section extending away from said disk and towards said leading edge.

7. A boom arm cutting disk device comprising:
  a disk, said disk being configured for mounting on a boom arm such that said disk is rotatable relative to the boom arm;
  a pair of cutters coupled to said disk, each said cutter extending from said disk, each of said cutters having a respective interior side edge aligned with a center of said disk, each of said cutters having a respective blade edge extending outwardly from said interior side edge, each said blade edge being parallel to said disk, each of said blade edges having a respective interior end aligned with a center of said disk, each said blade edge defining a leading edge of said cutter as said disk is rotated wherein said cutters are configured to cut material by contact with said leading edges as a central area of said disk is urged towards the material while said disk is rotated, each said cutter having a top surface, said top surface being planar and angled such that each said top surface extends away from said disk and towards said leading edge, each said cutter having a respective forward surface, said forward surface having a top section and a bottom section, said top section being angled relative to said bottom section such that said top section extends away from said bottom section extending away from said disk and towards said leading edge, each said cutter being structured to have a plurality of holes extending through said cutter from said top surface;
  a base, said base being coupled to said disk, said base having a plurality of connection apertures;
  a plurality of connectors, each of said connectors being insertable into an associated one of said holes of an associated one of said cutters wherein said connectors engage an associated one of said connection apertures such that said connectors couple said cutters to said base, each of said connectors having a head, said head of each said connector being inset into said associated hole when said connector is fully inserted into said associated hole; and
  a plurality of teeth coupled to and extending from said disk, each of said teeth being positioned radially outward from respective exterior side edges of said cutters wherein said teeth are configured to cut material outside of said central area as said disk is rotated.

8. A boom arm cutting disk device comprising:
  a disk, said disk being configured for mounting on a boom arm such that said disk is rotatable relative to the boom arm; and
  a pair of cutters coupled to said disk, each said cutter extending from said disk, each of said cutters having a respective interior side edge aligned with a center of said disk, each of said cutters having a respective blade edge extending outwardly from said interior side edge, each of said blade edges having a respective interior end aligned with a center of said disk, each said blade edge defining a leading edge of said cutter as said disk is rotated wherein said cutters are configured to cut material by contact with said leading edges as a central area of said disk is urged towards the material while said disk is rotated; and a plurality of teeth coupled to and extending from said disk, each of said teeth being positioned radially outward from respective exterior side edges of said cutters wherein said teeth are configured to cut material outside of said central area as said disk is rotated.

9. The device of claim 8, further comprising each said cutter having a top surface, said top surface being planar and angled such that each said top surface extends away from said disk and towards said leading edge.

10. The device of claim 8, further comprising said cutters each being coupled to a base, said base being coupled to said disk.

11. The device of claim 10, further comprising:
each said cutter being structured to have a plurality of holes extending through said cutter from said top surface; and
a plurality of connectors, each of said connectors being insertable into an associated one of said holes of an associated one of said cutters wherein said connectors couple said cutters to said base.

12. The device of claim 11, further comprising each of said connectors having a head, said head of each said connector being inset into said associated hole when said connector is fully inserted into said associated hole.

13. The device of claim 8, further comprising each said cutter having a respective forward surface, said forward surface having a top section and a bottom section, said top section being angled relative to said bottom section such that said top section extends away from said bottom section extending away from said disk and towards said leading edge.

* * * * *